(12) United States Patent
Deshpande et al.

(10) Patent No.: US 6,449,698 B1
(45) Date of Patent: Sep. 10, 2002

(54) METHOD AND SYSTEM FOR BYPASS PREFETCH DATA PATH

(75) Inventors: Sanjay Raghunath Deshpande, Austin; David Mui, Round Rock; Praveen S. Reddy, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,743

(22) Filed: Aug. 26, 1999

(51) Int. Cl.$^7$ ............................................. G06F 12/00
(52) U.S. Cl. ........................ 711/137; 711/138; 711/154; 712/205
(58) Field of Search ................................ 711/137, 138, 711/139, 154, 204, 205, 213; 712/205, 207

(56) References Cited

U.S. PATENT DOCUMENTS

| | | | |
|---|---|---|---|
| 5,257,359 A | * 10/1993 | Blasco et al. | 711/109 |
| 5,357,618 A | * 10/1994 | Mirza et al. | 711/213 |
| 5,659,712 A | * 8/1997 | Divivier et al. | 710/10 |
| 5,680,564 A | * 10/1997 | Divivier et al. | 711/137 |
| 6,311,260 B1 | * 10/2001 | Stone et al. | 711/137 |

OTHER PUBLICATIONS

IBM Technical Disclosure Bulletin; M–Way Set Associative Prefetch/Stream Buffer Design; vol. 40, No. 12, Dec. 1997, pp 129–131.

* cited by examiner

Primary Examiner—Matthew Kim
Assistant Examiner—Christian P. Chace
(74) Attorney, Agent, or Firm—Duke W. Yee; Casimer K. Salys

(57) ABSTRACT

A method and system for bypassing a prefetch data path is provided. Each transaction within a system is tagged, and as transactions are issued for retrieving data, the system has a data prefetch unit for prefetching data from a processor, a memory subsystem, or an I/O agent into a prefetch data buffer. A prefetch data buffer entry is allocated for a data prefetch transaction, and the data prefetch transaction is issued. While the prefetch transaction is pending, a read transaction is received from a transaction requestor. The address for the read transaction is compared with the addresses of the pending data prefetch transactions, and in response to an address match, the prefetch data buffer entry for the matching prefetch transaction is checked to determine whether data has been received for the data prefetch transaction. In response to a determination that data has not been received for the data prefetch transaction, the prefetch data buffer entry is deallocated, and the transaction tag for the data prefetch transaction is stored in a table for bypassing a prefetch data path. When data for a data prefetch transaction is received, its transaction tag is compared with transaction tags in the table for bypassing the prefetch data path, and in response to a transaction tag match, the received data is sent to the transaction requestor.

17 Claims, 6 Drawing Sheets

METHOD AND SYSTEM FOR BYPASS PREFETCH DATA PATH

BACKGROUND OF THE INVENTION

1. Technical Field

The present invention relates generally to an improved data processing system and, in particular, to a method and system for improving data throughput within a data processing system. Specifically, the present invention relates to a method and system for improving performance of storage access and control using prefetch.

2. Description of Related Art

Rapid advances in integrated circuit technology and in computer architecture have resulted in an increasing "memory reference delay gap" between relatively fast processing units and relatively slow memory. High performance processors with high throughput are available as commercial products, and multiprocessor systems using these processors are also available. However, in order to run at their peak speeds, these high performance systems require memory systems that are able to send data to the processor as fast as the processor requires, otherwise the processor stalls while it is waiting for data to be delivered. Such memory systems may be complex and/or expensive. As a result, the performance bottleneck of many current high performance computer systems is not the speed of the processor but rather the efficiency of the memory system.

In order to overcome the problem of an increasingly large memory reference delay gap between fast processing units and slow memory, cache or buffer memories are used. Buffer memory is a small, high speed memory between a processor or processors and a memory subsystem of a computer system. Its primary purpose is to provide high speed data/instruction accesses without the associated cost of an entire memory that uses high speed technology. This is achieved by keeping data and/or instructions that are expected to be referenced in the near future in the buffer.

When the required data for a requested memory transaction exists in the buffer, a "buffer hit" is said to occur, and the required data does not need to be fetched from slower, main memory. In contrast, when the required data for a requested memory transaction does not exist in the buffer, a "buffer miss" is said to occur, and the required data must be fetched from slower, main memory. Buffer misses are problematic because the amount of data that can be processed is limited to the speed at which data can be fetched from main memory. In general, system designers attempt to improve the buffer hit ratio so that the number of buffer misses are reduced and better performance can be obtained. As used herein, the term "buffer hit ratio" is defined as the probability that a data item requested by a processor unit will be found in the buffer, and the "buffer miss penalty" is defined as the time that the processing unit is required to wait for the requested data item to arrive when a buffer miss occurs.

In current buffer designs, instruction buffers are usually given a higher priority than data buffers for implementation and optimization. This is due to the current level of understanding of instruction reference behavior and data reference behavior and to the accuracy of current buffer models for instructions and for data. Since instruction references have a strong sequential reference characteristic, the prior art teaches a technique known as prefetching in which references are brought into the buffer memory before they are actually needed. If the prefetching is correct, memory reference delay times can be overlapped with program execution, at least partially overlapped and preferably completely overlapped. For non-sequential instruction references due to branch or jump instructions, "branch target prediction" may be used to predict the manner in which a program may execute. Together with the buffer prefetching technique, the number of buffer misses can be reduced if the prediction is correct.

Data reference behavior is generally considered random compared to instruction reference behavior. As a result, those buffering techniques that can improve instruction buffer performance might become ineffective when they are applied to data buffer performance. Since data reference behavior has been much less predictable than instruction reference behavior, buffer space may be wasted to store prefetched, non-referenced data, and data items in the buffer that are going to be referenced shortly might be replaced by non-referenced data. Branch technique prediction and the use of a branch target buffer are not applicable to data buffers as the distinction of branch references from sequential references in instruction references is not applicable to data references. Thus, it is much more difficult to improve the performance of data buffer designs than the performance of instruction buffer designs.

Therefore, it would be advantageous to have a method and system for improving the efficiency of a data buffer. It would be further advantageous to have a method and system for improving the efficiency of a data buffer through the use of enhanced buffer prefetching techniques.

SUMMARY OF THE INVENTION

The present invention provides a method and system for bypassing a prefetch data path. Each transaction within a system is tagged, and as transactions are issued for retrieving data, the system has a data prefetch unit for prefetching data from a processor, a memory subsystem, or an I/O agent into a prefetch data buffer. A prefetch data buffer entry is allocated for a data prefetch transaction, and the data prefetch transaction is issued. While the prefetch transaction is pending, a read transaction is received from a transaction requestor. The address for the read transaction is compared with the addresses of the pending data prefetch transactions, and in response to an address match, the prefetch data buffer entry for the matching prefetch transaction is checked to determine whether data has been received for the data prefetch transaction. In response to a determination that data has not been received for the data prefetch transaction, the prefetch data buffer entry is deallocated, and the transaction tag for the data prefetch transaction is stored in a table for bypassing a prefetch data path. When data for a data prefetch transaction is received, its transaction tag is compared with transaction tags in the table for bypassing the prefetch data path, and in response to a transaction tag match, the received data is sent to the transaction requestor.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
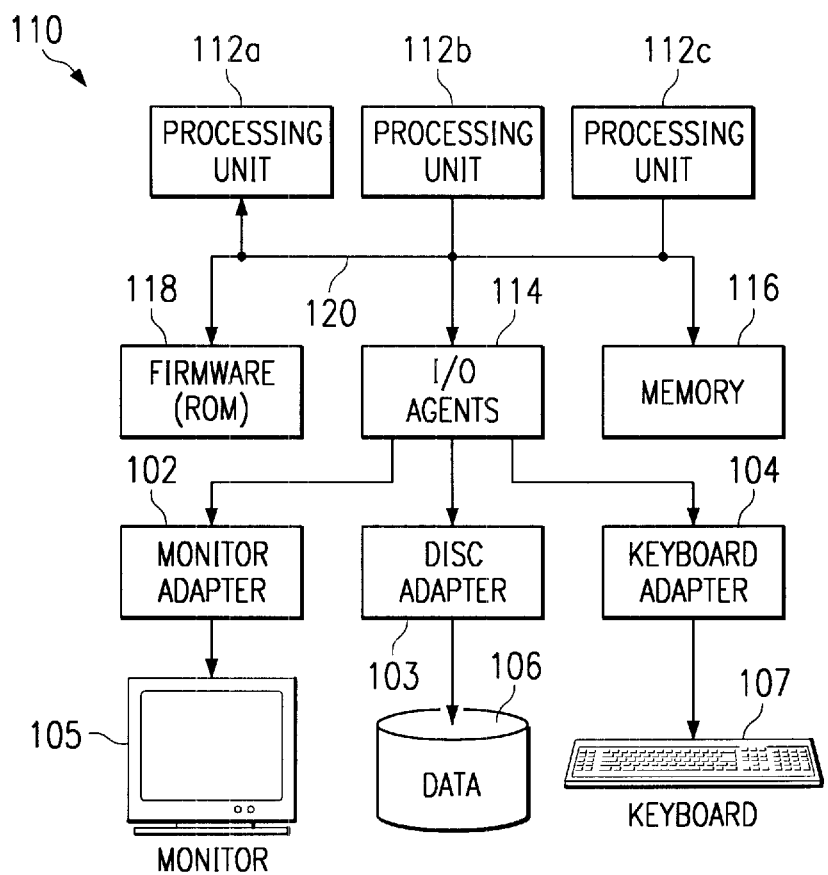
FIG. 1 is a block diagram of the basic structure of a conventional multiprocessor computer system.

With reference now to FIG. 1, the basic structure of a conventional multiprocessor computer system 110 is depicted. Computer system 110 has several processing units 112a, 112b, and 112c which are connected to various peripheral devices, including input/output (I/O) agents 114, which accept data from and provide data to a monitor adapter 102 and display monitor 105, keyboard adapter 104 and keyboard 107, and disk adapter 103 and permanent storage device 106, memory device 116 (such as dynamic random access memory or DRAM) that is used by the processing units to carry out program instructions, and firmware 118 whose primary purpose is to seek out and load an operating system from one of the peripherals (usually the permanent memory device) whenever the computer is first turned on. Processing units 112a–112c communicate with the peripheral devices by various means, including bus 120. Computer system 110 may have many additional components which are not shown, such as serial and parallel ports for connection to peripheral devices, such as modems or printers. Those skilled in the art will further appreciate that there are other components that might be used in conjunction with those shown in the block diagram of FIG. 1; for example, a display adapter might be used to control a video display monitor, a memory controller can be used to access memory 116, etc. In addition, computer system 110 may be configured with more or fewer processors. Other embodiments of the present invention may be implemented in other types of data processing systems, such as mainframes, servers, workstations, network computers, Internet appliances, palm computers, etc.

In a symmetric multiprocessor (SMP) computer, all of the processing units 112a–112c are generally identical; that is, they all use a common set or subset of instructions and protocols to operate and generally have the same architecture.

Figure 2:
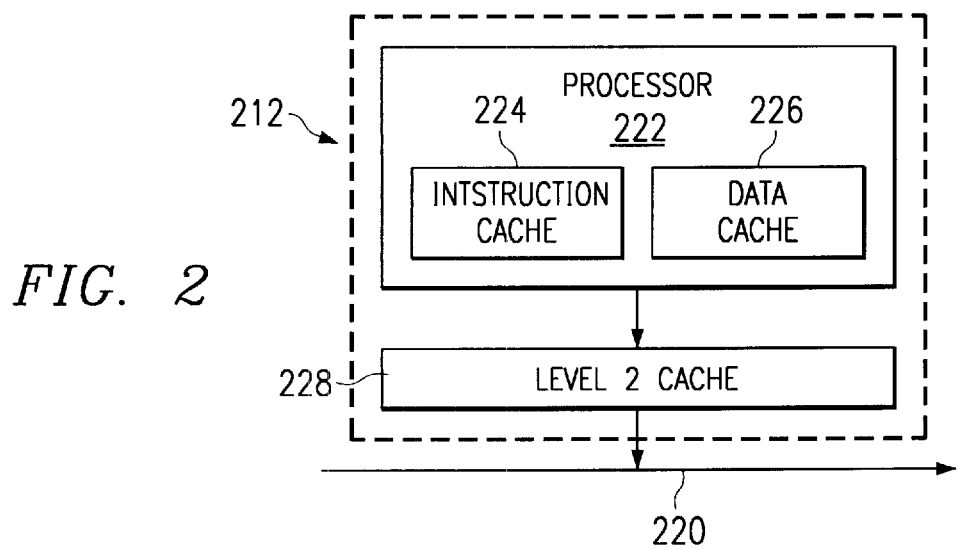
FIG. 2 is a block diagram depicting a typical processor architecture.

With reference now to FIG. 2, a typical organization is depicted. A processing unit 212 includes a processor 222 having a plurality of registers and execution units which carry out program instructions in order to operate the computer. The processor can also have caches, such as an instruction cache 224 and a data cache 226. These caches are referred to as "on-board" when they are integrally packaged with the processor's registers and execution units. Caches are commonly used to temporarily store values that might be repeatedly accessed by a processor, in order to speed up processing by avoiding the longer step of loading the values from memory, such as memory 116 shown in FIG. 1.

Processing unit 212 can include additional caches, such as cache 228. Cache 228 is referred to as a level 2 (L2) cache since it supports the on-board (level 1) caches 224 and 226. In other words, cache 228 acts as an intermediary between memory 116 and the on-board caches, and can store a much larger amount of information (instructions and data) than the on-board caches, although at a longer access penalty. For example, cache 228 may be a chip having a storage capacity of 256 or 512 kilobytes, while the processor 212 may be an IBM PowerPC™ 604-series processor having on-board caches with 64 kilobytes of total storage. Cache 228 is connected to bus 220, and all loading of information from memory 116 into processor 212 must come through cache 228. Although FIG. 2 depicts only a two-level cache hierarchy, multi-level cache hierarchies can be provided where there are many levels of serially connected caches.

Figure 3:
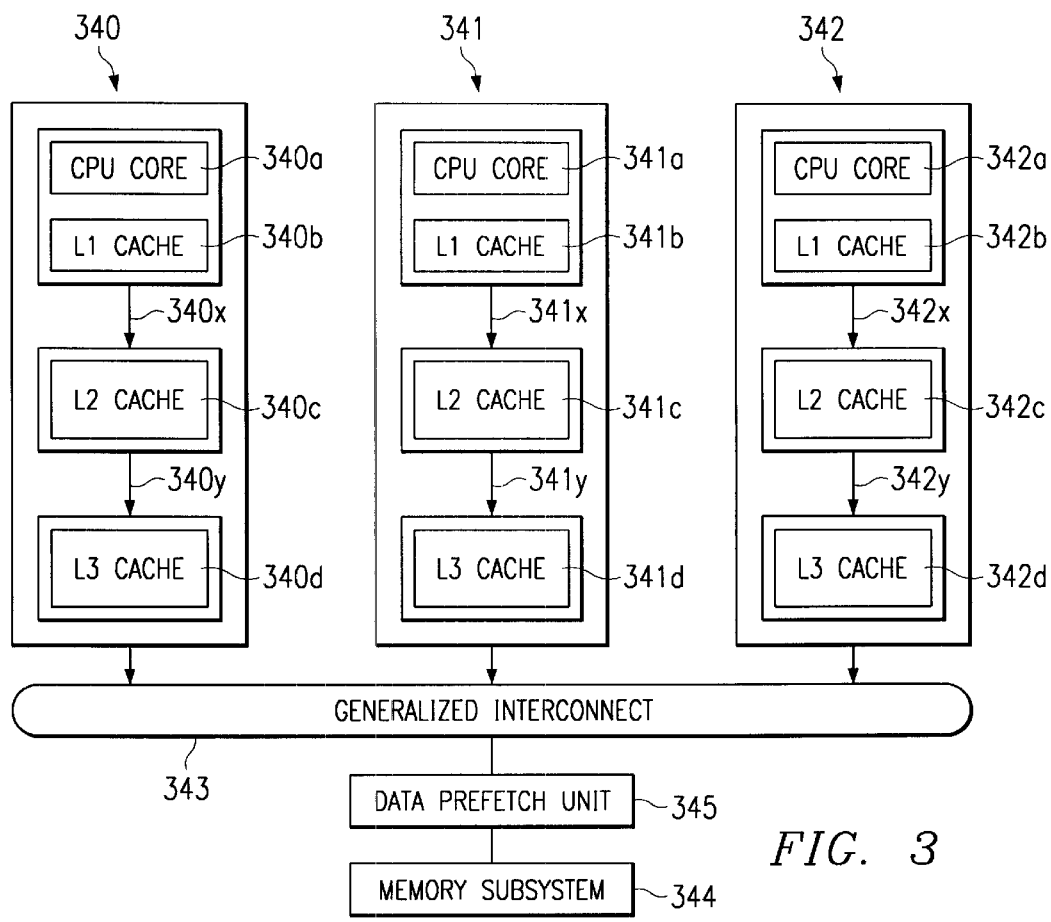
FIG. 3 is a block diagram depicting a computer system with three processing units.

With reference now to FIG. 3, a computer system is depicted with three processing units (340, 341, 342) consisting of processors (340a, 341a, 342a) each having an L1 cache (340b, 341b, 342b) connected to an L2 cache (340c, 341c, 342c) via an inter-cache connection (340x, 341x, 342x), which is connected to an L3 cache (340d, 341d, 342d) via an inter-cache connection (340y, 341y, 342y). In this hierarchy, each lower-level cache (i.e., an L3 cache is "lower" than an L2) is typically larger in size and has a longer access time than the next higher-level cache. Furthermore, it is common, although not absolutely required, that the lower-level caches contain copies of all blocks present in the higher-level caches.

The processors communicate over generalized interconnect 343. The processors pass messages over the interconnect indicating their desire to read or write memory locations. When a memory transaction is placed on the interconnect, all of the other processors "snoop" this transaction and decide if the state of their caches can allow the requested transaction to proceed and, if so, under what conditions. This communication is necessary because, in systems with caches, the most recent valid copy of a given block of memory may have moved from memory subsystem 344 to one or more of the caches in the system. When a processor wishes to read or write a block, it must communicate that desire with the other processing units in the system in order to maintain cache coherence. To achieve this, the cache-coherence protocol associates, with each block in each level of the cache hierarchy, a status indicator indicating the current "state" of the block. The state information is used to allow certain optimizations in the coherency protocol that reduce transaction traffic on generalized interconnect 343 and inter-cache connections 340x, 340y, 341x, 341y, 342x, 342y. As one example of this mechanism, when a processing unit executes a read transaction, it receives a message or signals indicating whether or not the read transaction must be retried later. If the read transaction is not retried, the message usually also includes information allowing the processing unit to determine if any other processing unit also has a still active copy of the block (this is accomplished by having the other lowest-level caches give a "shared" or "not shared" indication for any read transaction they do not retry).

Data prefetch unit 345 is used to prefetch cache lines that are likely to be accessed by one of the processors in the future. System performance may be enhanced by satisfying data references from prefetch buffers within the data prefetch unit rather than from the memory subsystem.

Figure 4:
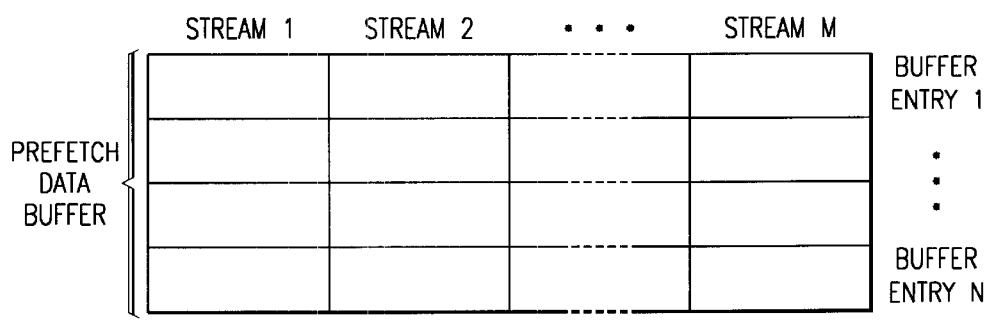
FIG. 4 depicts a prefetch data buffer that may be used within a data prefetch unit.

With reference now to FIG. 4, a prefetch data buffer that may be used within a data prefetch unit is depicted. The prefetch data buffer is: essentially an array that is M-set associative, where "M" denotes the number of streams. In the depicted example, prefetch data buffer consists of stream 1 through stream M, each of which consists of buffer entry 1 through buffer entry N. Prefetching may be selected or deselected through the use of a prefetch bit in the transaction to denote that a prefetch of X proximate addresses of a memory transaction is desired, where "X" may be a static or dynamic number that is system implementation dependent. A prefetch data unit containing a data prefetch buffer with the ability to prefetch proximate data is particularly desirable in scientific applications in which data references are more or less sequential. The number of streams and the number of buffer entries per stream may vary with system implementation.

Each memory transaction requested by one of the processors is tagged. A set of bits in the address field of a transaction are used to determine if prefetching is desired, the stream identifier, and the direction of prefetching. Prefetching may be selected or deselected through the use of a prefetch bit. The direction bit dictates whether descending or ascending prefetch addresses will be generated by the data prefetch unit. A stream identifier or a set of stream identifying bits are used to denote to which stream those prefetch addresses should be allocated. Hence, for a read transaction at address "A", assuming an ascending direction has been chosen, prefetch addresses (A+1) to (A+X) will be generated for the stream indicated by the stream identifying bits.

The buffer entries in each stream are fully associative. M-way set associative denotes that the M steams have fully addressable buffers, i.e. the generated prefetch address or addresses can be placed in any buffer entry for the stream if the entry is not reserved. In this manner, prefetching of data is not required to be sequential, i.e. the prefetch data buffer in FIG. 4 allows non-sequential data prefetch. Each buffer entry has a comparator that allows hits or matches on any entry in the prefetch array.

Since the prefetch array is fully addressable, entry deallocation is simple. If data has returned from the memory subsystem for an entry in which some type of invalidation condition is present, the entry can transition to an unreserved or unallocated state on the next cycle. With this scheme, one or more buffer entries may be freed without flushing the entire stream, as is required when using FIFO (first in/first out) buffers.

As noted earlier, system performance may be enhanced by satisfying data references from prefetch buffers within the data prefetch unit rather than from the memory subsystem. However, in some situations, while an attempt is being made to prefetch data from an address proximate to an address in a first read transaction, a second read transaction may be issued for the address being prefetched. In other words, the second read transaction hits on a prefetch buffer entry because their addresses match. In some implementations, the prefetch for the first transaction may be aborted, which causes its entire prefetch stream to be flushed.

The present invention is a method and system which provides a bypass prefetch data path. When a requested read transaction hits on a prefetch buffer entry, the prefetch transaction is converted to a normal or non-prefetch transaction, its prefetch buffer entry is deallocated, and the transaction is allowed to complete through an alternate path other than the prefetch buffer, i.e. the transaction bypasses the normal data path for completing prefetch transactions.

Figure 5:
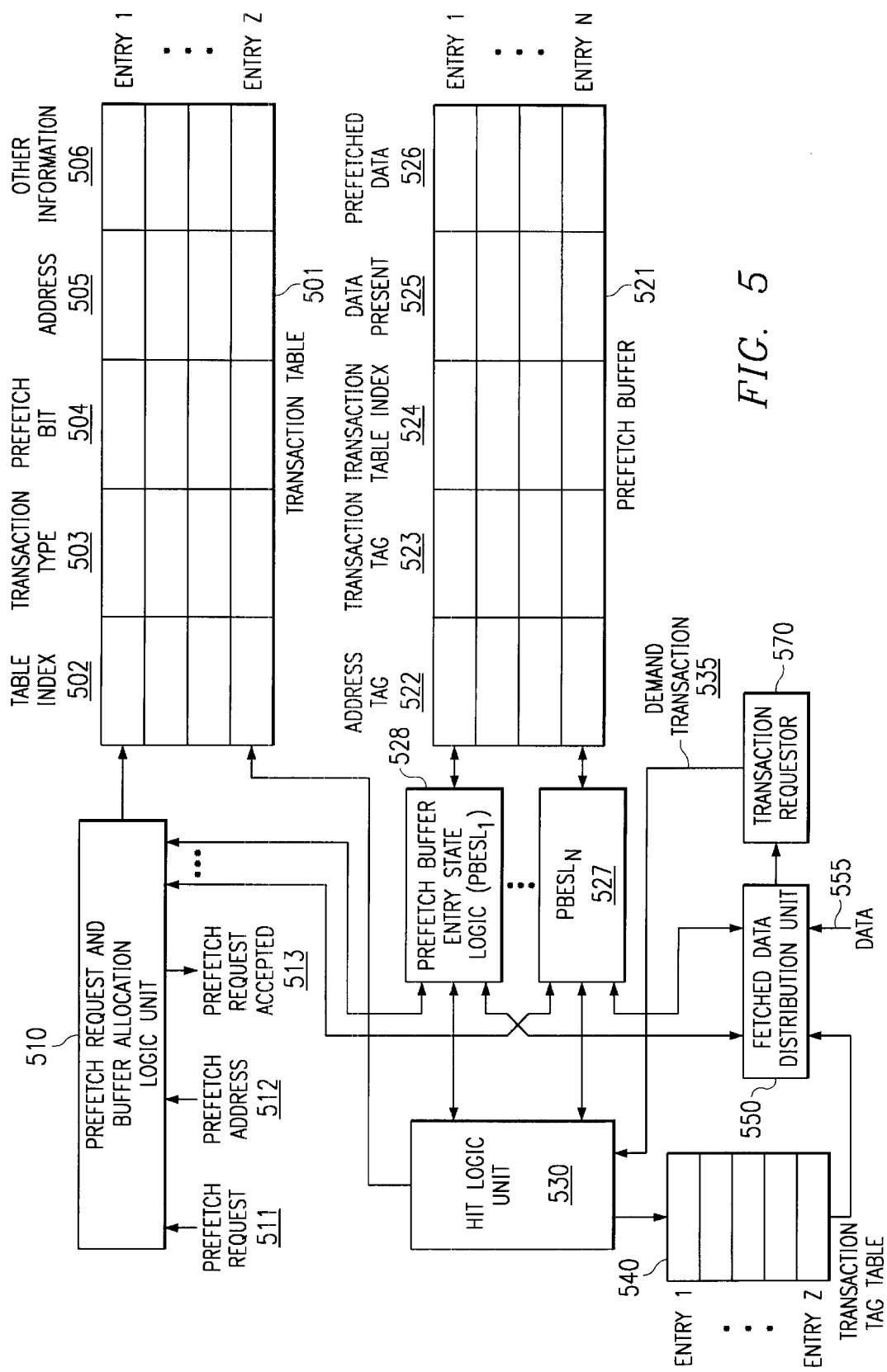
FIG. 5 is a diagram depicting data structures and logic units for a bypass prefetch datapath in accordance with the present invention.

With reference now to FIG. 5, a diagram depicts data structures and logic units for a bypass prefetch datapath in accordance with the present invention. Generic transaction tables for registering transactions issued to a memory subsystem are well known in the art. Transaction table 501 contains a number of entries for recording a plurality of transactions. Within each entry in the transaction table, several types of information provide the ability for the system to track or monitor transactions. Table index 502 indicates the location of a particular transaction within the transaction table. Table index 502 may be used, for example, to convert the appropriate transaction in a transaction table entry from a prefetch Read to a demand Read, as explained further below. Alternatively, the transaction table may not include a transaction table index, and it would be assumed that the processing logic that accessed the transaction table may keep a pointer to a table entry that is being processed. Transaction type 503 indicates whether the transaction is a read, write, or other type of transaction that may vary depending upon the bus protocol implemented within the system. Address 505 provides the source or target address for the transaction stored in the transaction table entry. Other information 506 may be stored within the transaction table entry depending upon the implementation of transactions within the system.

In accordance with the present invention, prefetch bit 504 is stored in transaction table 501. Prefetch bit 504 provides a flag for indicating whether the transaction stored within the transaction table entry originated as a prefetch request or as a demand request. Each transaction that is issued to the memory subsystem may be classified as originating from a data prefetch unit, such as data prefetch unit 345 shown in FIG. 3, or from a master device, such as a processor or I/O agent. If the transaction originated from a data prefetch unit, then prefetch bit 504 would be set to one; otherwise, prefetch bit 504 is set to zero.

Prefetch request and buffer allocation logic unit 510 receives prefetch request signal 511 and prefetch address 512. The prefetch request signal may originate from a data prefetch unit or from a component within the data prefetch unit, or the prefetch request and buffer allocation logic unit may be implemented as a component within a data prefetch unit. Prefetch request and buffer allocation logic unit 510 determines through prefetch buffer entry state logic 528 (PBESL) and 527 whether an empty prefetch buffer entry within prefetch buffer 521 exists. If so, a transaction is registered in transaction table 501 with the prefetch bit of the entry set to one. An entry in prefetch buffer 521 is also allocated for the prefetch transaction, and prefetch and prefetch request and buffer allocation logic unit 510 returns prefetch request accepted signal 513 to indicate that the prefetch request has been issued.

Prefetch buffer 521 has multiple entries; in the depicted example, the prefetch buffer has entry 1 through entry N. Each entry in the prefetch buffer has multiple fields for representing or storing various types of information for each prefetch transaction that is recorded within the prefetch buffer. Address tag 522 contains a portion of an address indicating the location of the prefetched data, e.g., the address tag may provide the address of a cache line that has been requested in the prefetch transaction. Transaction tag 523 provides an identifier for the issued prefetch transaction. Transaction table index 524 provides an index value into transaction table 501 for the transaction table entry in which the prefetch transaction has been registered. Data present 525 provides a flag that indicates whether the data for a prefetch transaction has been received and stored within prefetch buffer 521. Prefetched data 526 stores the data retrieved from the memory subsystem. If prefetched data 526 contains valid data, data present 525 is set to one; otherwise, data present 525 is set to zero.

At any given time, each allocated entry in the prefetch buffer contains a prefetch transaction that is in a particular state. To ensure that each prefetch entry transitions to the appropriate state, each entry is associated with a corresponding PBESL. By providing this type of logic with each prefetch buffer entry, comparisons and operations may be performed in parallel for the multiple entries.

Hit logic unit 530 receives demand transaction 535 and determines whether the address for the demand transaction has a hit on one of the prefetch transactions registered in the prefetch buffer. This comparison is performed in parallel through $PBESL_1$ 528 through $PBESL_N$ 527. If a hit exists and the matching prefetch buffer entry does not have data present, i.e. data has not yet been received for the prefetched transaction, then hit logic unit 530 sends a signal to transaction table 501 to reset prefetch bit 504 for the transaction table entry given by transaction table index 524 of the matching entry in the prefetch buffer. By resetting the prefetch bit in the transaction table, hit logic unit 530 essentially converts the prefetch transaction to a demand transaction. Hence, it is not necessary to issue demand transaction 535 to the system since a prefetch transaction for the requested address is currently pending.

Hit logic unit 530 waits for a period of time and then rechecks whether data has been received for the prefetch transaction stored in the prefetch buffer entry that had a matching demand transaction. The amount of time that hit logic unit 530 waits to make a secondary determination may be configurable or adjustable depending upon the system implementation. If data still has not arrived for the prefetch transaction from the appropriate location, such as a memory subsystem or another processor, hit logic unit 530 deallocates the prefetch buffer entry for the prefetch transaction and stores the transaction tag for the prefetch transaction in transaction tag table 540. The transaction tag table has the same number of entries as the transaction table. Hence, in the "worst case" scenario in which each transaction registered in the transaction table is a prefetch transaction that has had a matching demand transaction, transaction tag table 540 has an adequate number of entries for accommodating the transactions. The location within the transaction tag table for the transaction tag from the deallocated prefetch buffer entry is provided by the transaction table index which is stored within the prefetch buffer entry. Once the prefetch buffer is deallocated, the data prefetch unit is able to request another prefetch.

Fetched data distribution 550 receives data 555 from a memory subsystem or another processor for a requested transaction. The fetched data distribution unit compares the transaction tag for data 555 with the transaction tags stored within transaction tag table 540. If the transaction tag for received data 555 matches a transaction tag within the transaction tag table, and the prefetch bit 504 is not set, then fetched data distribution unit 550 forwards the data for the transaction to the appropriate transaction requestor 570. Otherwise, fetched data distribution unit 550 communicates with one of the PBESLs to store data 555 within the appropriate prefetch data buffer entry. At that point, data present 525 would be set for the prefetch buffer entry to indicate that prefetched data has been received for the prefetch transaction. In this manner, transaction tag table 540 provides a mechanism for alternatively routing prefetched data so that the prefetch data is not stored within the prefetch data buffer before forwarding the prefetched data to a requestor that has generated a demand transaction with an address that matches the address for a prefetch transaction.

Figures 6, 7:
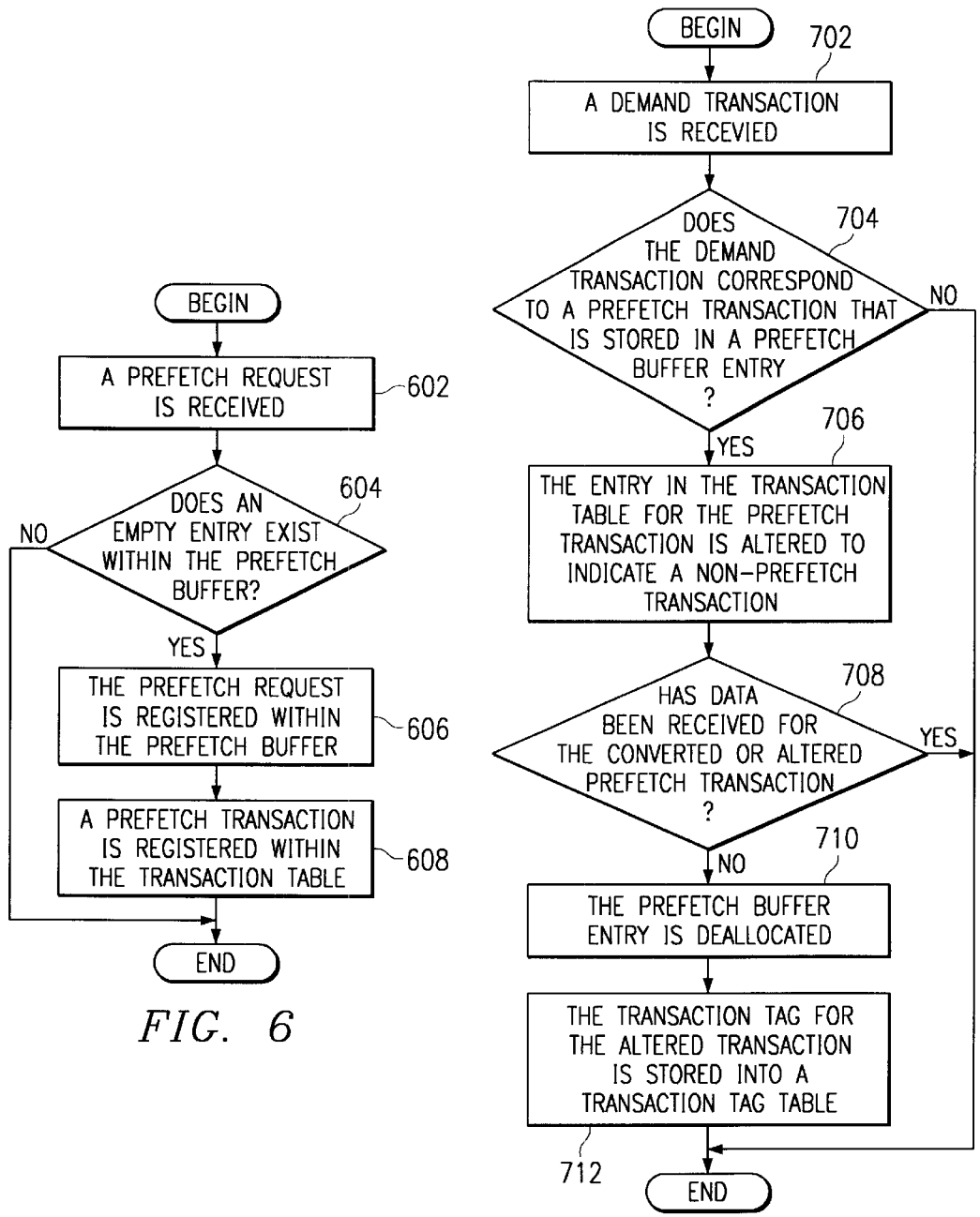
FIG. 6 is a flowchart depicting a process for registering a prefetch transaction.
FIG. 7 is a flowchart depicting a process for detecting a hit on a prefetch buffer entry.

With reference now to FIG. 6, a flowchart depicts a process for registering a prefetch transaction. The process begins when a prefetch request is received (step 602). A determination is made as to whether an empty entry exists within the prefetch buffer (step 604). If not, then the prefetch request is rejected, and the process is completed for the prefetch request. If an empty entry exists within the prefetch buffer, then the prefetch request is registered within the prefetch buffer (step 606), and a prefetch transaction is registered within the transaction table (step 608). The prefetch transaction is issued, and the preliminary processing for a prefetch request is completed.

With reference now to FIG. 7, a flowchart depicts a process for detecting a hit on a prefetch buffer entry. The process begins when a demand transaction is received (step 702). A determination is then made as to whether the demand transaction corresponds to a prefetch transaction that is stored in a prefetch buffer entry (step 704). If there is no hit between the demand transaction and one of the registered prefetch transactions, then the process completes.

If the address of a demand transaction matches an address of a prefetch transaction in the prefetch buffer, and data has not yet been received for the prefetch transaction, then the entry in the transaction table for the prefetch transaction is altered to indicate a non-prefetch transaction, essentially converting the prefetch transaction to a non-prefetch transaction (step 706). After a configurable time period, a determination is made as to whether data has yet been received for the converted or altered prefetch transaction (step 708). If so, then the process is complete with respect to the prefetch process as the received data will eventually be forwarded to the transaction requestor. If data has not yet been received, then the prefetch buffer entry is deallocated (step 710) and the transaction tag for the altered transaction is stored into a transaction tag table (step 712). The process is then complete with respect to matching a demand transaction with a prefetch transaction.

Figure 8:
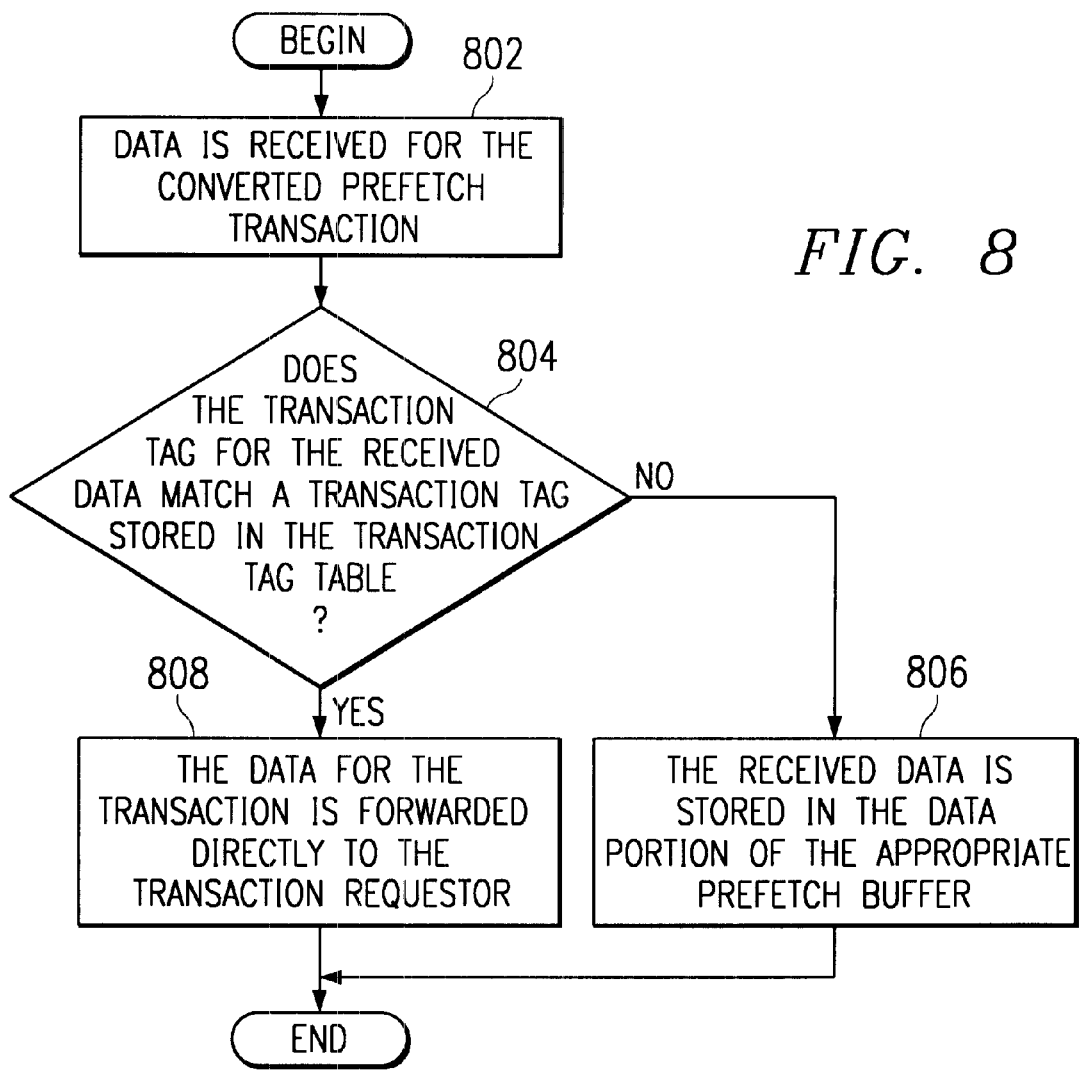
FIG. 8 is a flowchart depicting a process for distributing fetched data along a bypass prefetch datapath.

With reference now to FIG. 8, a flowchart depicts a process for distributing fetched data along a bypass prefetch datapath. The process begins when data is received for the converted prefetch transaction (step 802). A determination is made as to whether the transaction tag for the received data matches a transaction tag stored in the transaction tag table (step 804). If a match is not made, then the received data is stored in the data portion of the appropriate prefetch buffer entry that has a corresponding transaction tag (step 806). The process is then completed with respect to prefetched data which has not had a matching demand transaction.

If the transaction tag for the received data matches a transaction tag stored in the transaction tag table, and the prefetch bit in the corresponding transaction table entry is not set, then the data for the transaction is forwarded directly to the transaction requestor (step 808). In this manner, the prefetched data is not first stored in the prefetch data buffer before forwarding the data to a requestor that has also issued a demand transaction for the corresponding data. The process for the prefetched data is then complete. In this manner, the transaction tag table acts as a table for bypassing a prefetch data path.

Figure 9:
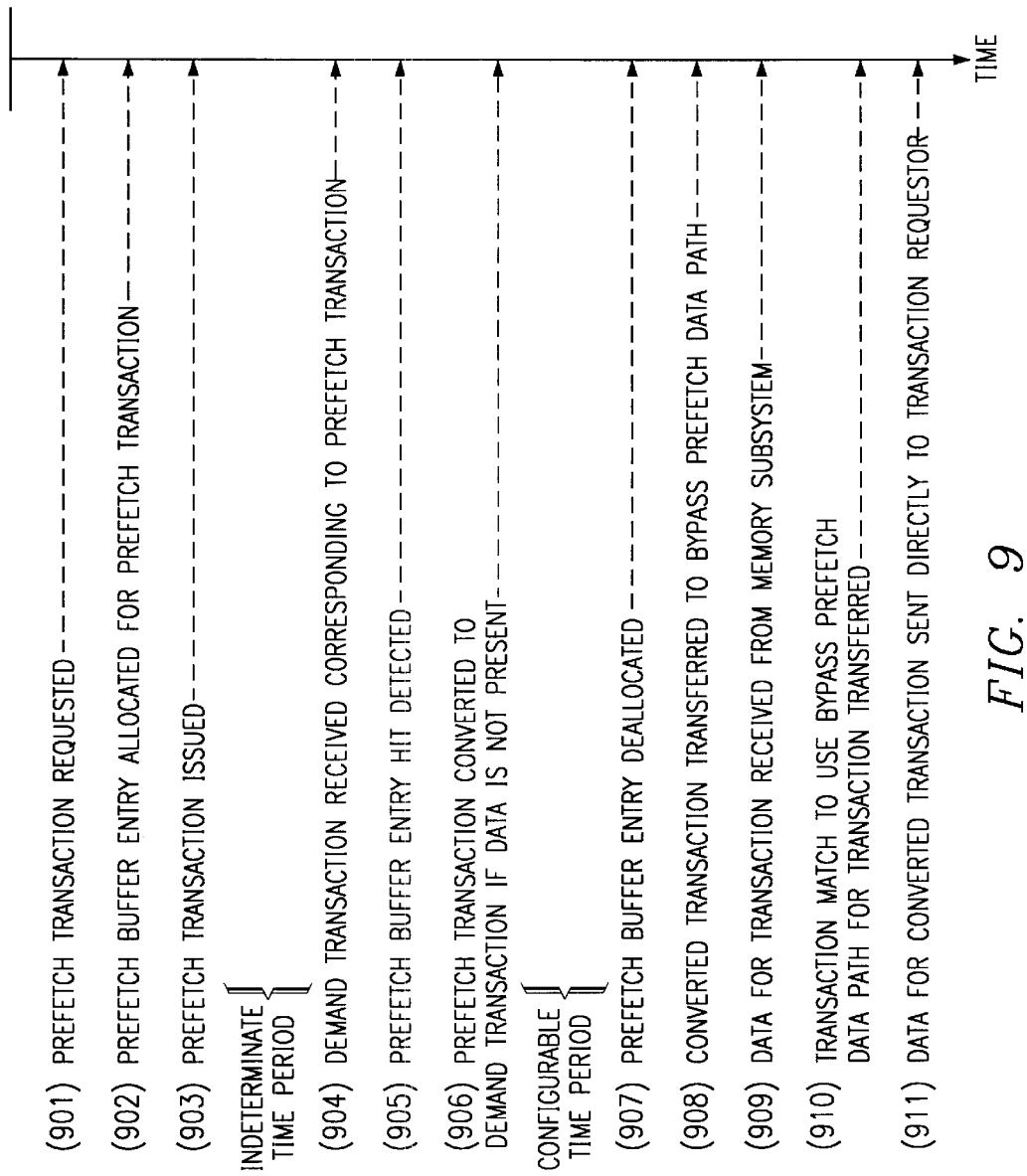
FIG. 9 is a timeline depicting some of the relevant actions that occur when a demand transaction hits on a prefetch transaction that has already been issued.

With reference now FIG. 9, a timeline (not to scale) depicts some of the relevant actions that occur when a demand transaction hits on a prefetch transaction that has already been issued. A prefetch transaction is requested (901), and a prefetch buffer entry is allocated for the prefetch transaction (902). The prefetch transaction is then issued (903). After an indeterminate period of time, a demand transaction is received that corresponds to a prefetch transaction (904). A hit is detected on the prefetch buffer entry with the corresponding prefetch transaction (905), and the prefetch transaction is converted to a demand transaction (906) if data is not available. After a configurable time period, such as a particular number of cycles later, since data has not yet been received for the prefetch transaction, the prefetch buffer entry is deallocated (907). The converted prefetch transaction is transferred to use a bypass prefetch datapath (908). At some point in time, data is received for the converted prefetch transaction (909), and a match is made between the transaction tag for the received data and a transaction tag for the converted prefetch transaction that has been transferred to use the bypass prefetch datapath (910). The match between transaction tags and the further condition that the prefetch bit 504 in the transaction table is not set then causes the data for the converted transaction to be sent directly to the transaction requestor (911).

The advantages of the present invention should be apparent in view of the detailed description provided above. The present invention is a method and system which provides a bypass prefetch data path. When a requested read transaction hits on a prefetch buffer entry, the prefetch transaction is converted to a normal or non-prefetch transaction, its prefetch buffer entry is deallocated, and the transaction is allowed to complete through an alternate path other than the prefetch buffer, i.e. the transaction bypasses the normal data path for completing prefetch transactions.

Since a prefetch buffer entry must be reserved until the first beats of prefetched data are sent to a requesting processor, the deallocation of a prefetch buffer entry may not occur for a significant period of time. By converting a prefetch read transaction into a demand read transaction according to the method of the present invention, the prefetched data bypasses the prefetch data buffers. Because the number of prefetch buffer entries are fixed and the variability of data arriving from a memory subsystem is dependent upon system load, bus traffic, etc., the sooner the prefetch buffer entries are freed, the sooner additional prefetch reads can be placed into the prefetch buffer entries and sent to the memory subsystem. The system effectively has a higher prefetch buffer utilization rate which increases the throughput of the system.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for prefetching data comprising the steps of:

comparing an address for a demand transaction with an address for a prefetch transaction;

in response to an address match, determining whether data has been received for the prefetch transaction;

in response to a determination that data has not been received for the prefetch transaction, altering the prefetch transaction so that data retrieved for the prefetch transaction bypasses a prefetch data path.

2. A method for prefetching data in a data processing system by using data prefetch transactions, each transaction in the data processing system comprising a transaction tag, the method comprising the steps of:

allocating a prefetch data buffer entry for a data prefetch transaction;

issuing the data prefetch transaction;

receiving a read transaction from a transaction requestor;

comparing an address for the read transaction with the address of the data prefetch transaction;

in response to an address match, determining whether data has been received for the data prefetch transaction; and in response to a determination that data has not been received for the data prefetch transaction, deallocating the prefetch data buffer entry.

3. The method of claim 2 further comprising:

in response to a determination that data has not been received for the data prefetch transaction, storing the transaction tag for the data prefetch transaction in a table for bypassing a prefetch data path.

4. The method of claim 3 further comprising:

receiving data for a data prefetch transaction;

comparing the transaction tag for the data prefetch transaction for which data has been received with transaction tags in the table for bypassing the prefetch data path;

in response to a transaction tag match, sending the received data to the transaction requestor.

5. The method of claim 2 further comprising:

registering the data prefetch transaction in a transaction table entry;

setting a prefetch flag in the transaction table entry; and storing an index for the transaction table entry in the prefetch data buffer entry.

6. The method of claim 2 further comprising, prior to deallocating the prefetch data buffer entry, resetting the prefetch flag in the transaction table entry.

7. The method of claim 6 further comprising:

waiting a predetermined time period between resetting the prefetch flag in the transaction table entry and deallocating the prefetch data buffer entry.

8. The method of claim 7 wherein the predetermined time period is dynamically configurable.

9. A data processing system for prefetching data in a data processing system by using data prefetch transactions, each transaction in the data processing system comprising a transaction tag, the data processing system comprising:

allocating means for allocating a prefetch data buffer entry for a data prefetch transaction;

issuing means for issuing the data prefetch transaction;

receiving means for receiving a read transaction from a transaction requestor;

comparing means for comparing an address for the read transaction with the address of the data prefetch transaction;

determining means for determining, in response to an address match, whether data has been received for the data prefetch transaction; and deallocating means for deallocating, in response to a determination that data has not been received for the data prefetch transaction, the prefetch data buffer entry.

10. The data processing system of claim 9 further comprising:

storing means for storing, in response to a determination that data has not been received for the data prefetch transaction, the transaction tag for the data prefetch transaction in a table for bypassing a prefetch data path.

11. The data processing system of claim 10 further comprising:

receiving means for receiving data for a data prefetch transaction;

comparing means for comparing the transaction tag for the data prefetch transaction for which data has been received with transaction tags in the table for bypassing the prefetch data path;

sending means for sending, in response to a transaction tag match, the received data to the transaction requestor.

12. The data processing system of claim 9 further comprising:

registering means for registering the data prefetch transaction in a transaction table entry;

setting means for setting a prefetch flag in the transaction table entry; and storing means for storing an index for the transaction table entry in the prefetch data buffer entry.

13. The data processing system of claim 9 further comprising, prior to deallocating the prefetch data buffer entry, resetting means for resetting the prefetch flag in the transaction table entry.

14. The data processing system of claim 13 further comprising:

waiting means for waiting a predetermined time period between resetting the prefetch flag in the transaction table entry and deallocating the prefetch data buffer entry.

15. The data processing system of claim 14 wherein the predetermined time period is dynamically configurable.

16. The data processing system of claim 9 further comprising:

a seventh mode of operation for storing, in response to a determination that data has not been received for the data prefetch transaction, the transaction tag for the data prefetch transaction in a table for bypassing a prefetch data path.

17. A data processing system for prefetching data in a data processing system by using data prefetch transactions, each transaction in the data processing system comprising a transaction tag, the data processing system comprising the following modes of operation:

a first mode of operation for allocating a prefetch data buffer entry for a data prefetch transaction;

a second mode of operation for issuing the data prefetch transaction;

a third mode of operation for receiving a read transaction from a transaction requestor;

a fourth mode of operation for comparing an address for the read transaction with the address of the data prefetch transaction;

a fifth mode of operation for determining, in response to an address match, whether data has been received for the data prefetch transaction; and a sixth mode of operation for deallocating, in response to a determination that data has not been received for the data prefetch transaction, the prefetch data buffer entry.

* * * * *